Oct. 10, 1950     J. L. ANAST     2,524,746
GLIDE PATH SENSOR FOR AIRCRAFT

Filed July 9, 1947     2 Sheets-Sheet 1

INVENTOR.
JAMES L. ANAST
BY Wade Krontz AND
ATTORNEY
Charles L. Burgoyne
AGENT

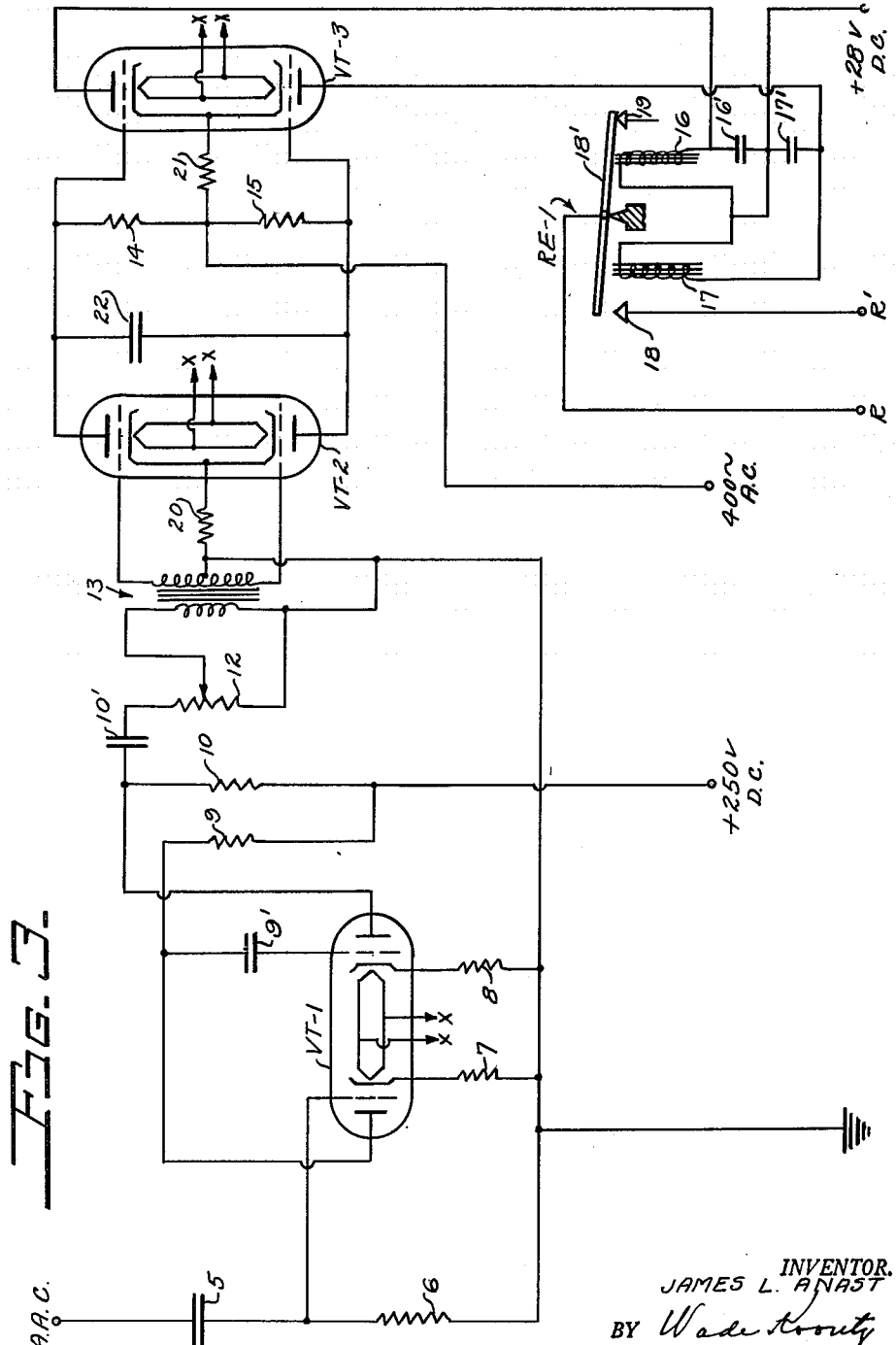

Patented Oct. 10, 1950

2,524,746

UNITED STATES PATENT OFFICE 2,524,746

GLIDE PATH SENSOR FOR AIRCRAFT

James L. Anast, Xenia, Ohio

Application July 9, 1947, Serial No. 759,898

1 Claim. (Cl. 343—108)

(Granted under the act of March 3, 1883, as amended April 30, 1928; 370 O. G. 757)

The invention described herein may be manufactured by or for the United States Government for governmental purposes without payment to me of any royalty thereon.

The present invention relates to automatic landing systems for aircraft, and more particularly to an apparatus or unit capable of sensing the glide path signal field when the path of the aircraft intersects the signal field.

The primary object of the invention is to provide an improved automatic landing system for aircraft, including means operable in conjunction with an automatic pilot to provide aircraft guidance in the direction of the landing runway and also along a predetermined glide path.

In automatic landing systems it is the current practice to provide both runway localizer and glide path signal fields which are intercepted by special radio receivers carried by the aircraft to give signals which may be fed to an electrical auto pilot to cause the aircraft to be automatically guided to a safe landing. The localizer signal is preferably applied to the auto pilot at some distance from the landing field while the glide path signal is applied later in the landing sequence. The application of the signals is effected by automatic actuating means including marker beacons radiating signals upwardly and placed under the points in space where the localizer and glide path signals should be applied to the auto pilot. However to avoid application of glide path signals when the aircraft may be either above or below the glide path beam it is thought desirable to use the glide path signal field or beam itself as an actuating impulse, rather than a special inner marker beacon. By so doing the aircraft will necessarily be on the glide path when the signal is applied to the auto pilot, and therefore will not develop a tendency to hunt up and down in a wavering path and possibly come in for a landing or touchdown at too steep an angle. Thus it is a further object of the invention to substitute in an automatic landing system a glide path sensor unit in place of the usual inner marker beacon and marker beacon receiver. The invention not only gives the improved result as noted above, but eliminates one ground station whose sensing function may be more effectively accomplished by the glide path signal field operating in cooperation with a novel glide path sensor unit carried by the aircraft.

A related object of the invention is to provide an automatic aircraft flight control system which includes a stepping switch or sequence selector capable of making appropriate electrical connections at the beginning of the separate steps or phases of the automatic flight, and in such a system it is an object to provide a glide path sensor unit carried on the aircraft and capable of actuating the sequence selector at the moment the aircraft intercepts the glide path beam.

The above and other objects of the invention will become apparent on reading the following detailed description in conjunction with the drawings, in which:

Fig. 3 is a wiring diagram of the glide path sensor unit forming an essential part of the automatic landing system.

Figure 1:
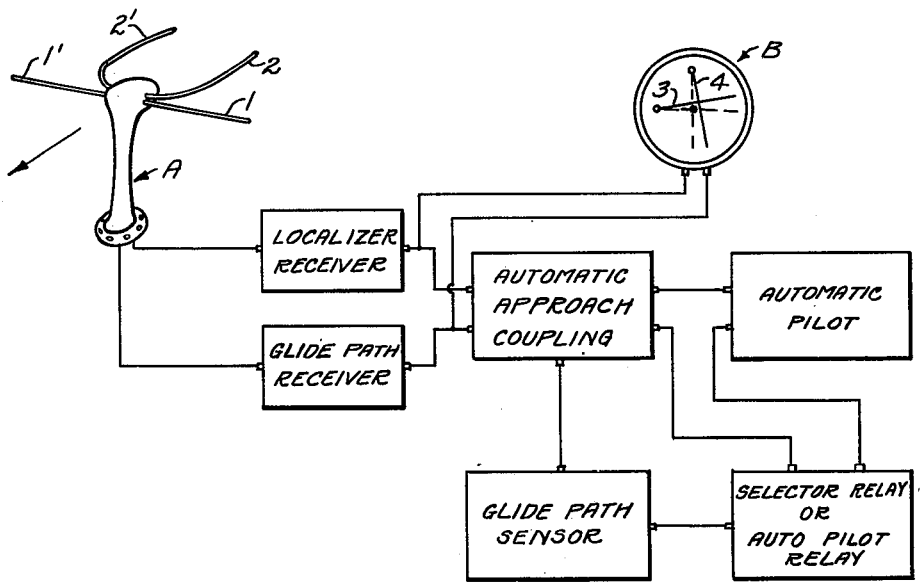
Fig. 1 is a block diagram of an automatic landing system in accordance with the invention and includes a perspective view of the receiving antennas to be carried by the aircraft.
Figure 2:
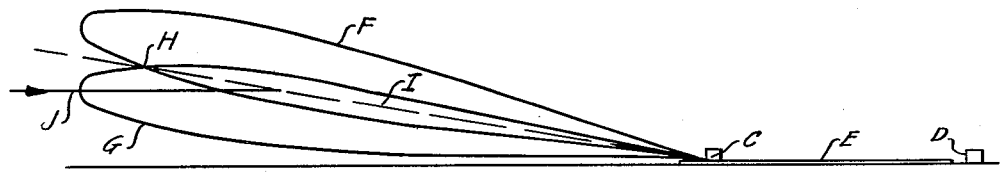
Fig. 2 is a diagram of a glide path signal pattern and of a landing runway having glide path and localizer stations adjacent thereto.

Referring first to Fig. 1 there is shown an antenna assembly A adapted for mounting on the aircraft topside of the fuselage and almost over the pilot's compartment. This is a standard type of antenna construction and as usual includes the straight dipole members 1 and 1' and the curved dipole members 2 and 2'. The members 1 and 1' are connected by wires to the glide path receiver, while the members 2 and 2' are connected to the localizer receiver, both receivers forming part of the automatic landing system and being mounted within the aircraft. The antenna assembly is so mounted that the members 1 and 1' extend transversely of the aircraft, the members 2 and 2' point toward the tail of the aircraft, while the arrow indicates the direction of aircraft flight. The ground stations which produce the glide path and localizer signal fields are well understood and available as standard units. In Fig. 2 the glide path transmitting station located to one side of the runway E is indicated at C, and the runway localizer transmitting station positioned on the longitudinal axis of the runway is indicated at D.

In Fig. 1 it will be noted that the localizer and glide path receivers connect both to the automatic approach coupling and to a two needle indicator B. The indicator B is provided with a needle 3 responsive to the glide path signals and a needle 4 responsive to the localizer signals. The broken cross lines on the indicator show the ideal needle settings, wherein the aircraft is right on the glide path beam and localizer beam.

The two receivers are so constructed that the output signals therefrom are direct currents having polarities at any instant which depend on the relative position of the aircraft with respect to the localizer and glide path beams. Thus by the deflection of the two needles 3 and 4 the indicator B is adapted to show the deviation of the aircraft from the correct approach path. Furthermore the amount of deflection of the needles is proportional to the deviation of the aircraft from the approach path. The condition depicted by the setting of the needles in Fig. 1 is one where the aircraft is below and to the left of the correct approach path. In other words the intersection of the cross lines or reference lines is below the glide path needle 3 and to the left of the localizer needle 4. This indicator is very useful in making blind landings under manual control of the aircraft, since the pilot by watching the indicator needles carefully may bring the aircraft in on the correct approach path.

In landing under automatic control of the aircraft the signals from the localizer and glide path receivers are coupled to an electrical auto pilot by means of the automatic approach coupling unit, the purpose of which is to modify the electrical characteristics of the receiver signals so that they may be made to operate the auto pilot. The electrical and mechanical system which makes the auto pilot respond to localizer and glide path signals may be arranged in accordance with U. S. Patents No. 2,423,336, No. 2,423,337 and No. 2,496,809, granted to Francis L. Moseley. Such a system includes separate channels for the glide path signals and for the localizer signals. The same signal applied to the auto pilot pitch control channel is also used in the present invention to supply the glide path sensor, so called because of its ability to sense the exact center or central axis of the glide path signal field. The real purpose of the sensor is for actuation of a relay or automatic switch which is adapted to cause the auto pilot to be connected electrically with the glide path signal at the instant the aircraft intercepts the glide path signal field axis.

Noting again Fig. 2 there is shown in diagrammatic form the signal field emanating from the glide path transmitter station C. The two intersecting lobes of radiant electrical energy F and G which combine to provide the glide path have a general shape as indicated by the solid curved lines. The separate lobes are radiated from a special antenna connected to the transmitter C, the latter usually being located 500 feet to one side of the runway axis. The lobes F and G interset in space at point H which represents an equisignal position. The dashed line I drawn downwardly to the point of origin of the radiant energy represents the ideal glide path (usually around 2½ degrees with respect to the runway) along which the signal strength of the two lobes is equal. The line J represents the path of an aircraft approaching the runway in level flight and preparing for an instrument landing by the use of indicator B or a landing under automatic guidance by use of the approach coupling and auto pilot. Until the aircraft reaches the glide path I the indicator needle 3 will stay up as shown in Fig. 1 showing that the aircraft is below the glide path, the swing of the needles 3 and 4 on either side of the reference cross lines being caused by the change of polarity of the direct currents fed to the instrument B from the glide path and localizer receivers.

As explained above the glide path signals as modified by the automatic approach coupling are fed to the glide path sensor unit, which unit is adapted to actuate a selector relay or auto pilot relay for making the proper connection with the auto pilot glide path channel and thus accomplishing an automatic landing under the glide path guidance. The signal fed to the instrument B and to the approach coupling from the glide path receiver will vary in polarity depending on whether the aircraft is above or below the glide path. Assuming first that a positive voltage is impressed on the approach coupling, the voltage will be transposed in the approach coupling to a 400 cycle alternating current in phase with the alternating current source of the same frequency. This source which supplies the approach coupling, the auto pilot and the glide path sensor is ordinarily from an inverter carried by the aircraft. Similarly if a negative voltage is fed to the approach coupling, the voltage will be transposed in the approach coupling to a 400 cycle alternating current out of phase with the alternating current source. This voltage of phase shifting characteristic from the automatic approach coupling is connected to the glide path sensor at the terminal A. A. C. (see Fig. 3). The voltage is first amplified through two stages of resistance-coupled amplification employing the two triode sections of tube VT—1. The coupling condenser 5 may have a value of 0.02 microfarad, the resistor 6 a value of 200,000 ohms and the resistors 7 and 8 about 3000 ohms each. The load resistors 9 and 10 may be of 100,000 ohms each, and the coupling condensers 9' and 10' may be of 0.02 and 0.10 microfarad, respectively.

The output of the second section of VT—1, which may be controlled as to amplitude by the volume control 12, is converted to a push-pull signal by transformer 13 and applied to the grids of tube VT—2. The plates of the two sections of VT—2 are connected through resistors 14 and 15 to one side of the 400 cycle alternating current supply, thus causing the 400 cycle voltage to be applied in phase to the two plates, so that the plate to cathode paths of the two sections act as rectifiers for the 400 cycle alternating current. This action will cause a direct potential to appear across resistors 14 and 15. The relative values of these two potentials is determined by the phase relation between the grid and plate signals of each section of VT—2. Since the potentials on the two grids are 180 degrees out of phase and since the potentials on the plates are in phase, the grid and plate potentials will be in phase on one section of VT—2 and 180 degrees out of phase in the other section. The direct potential developed across the resistor associated with the in phase section will be greater than that developed across the resistor associated with the out of phase section. If the phase of the signal applied to the primary of the transformer 13 is shifted in phase by 180 degrees then the effect is to shift the maximum direct current potential developed by the rectifying action of VT—2 from one of resistors 14 or 15 to the other.

The direct potential developed across resistor 14 is applied between the grid and cathode of the upper section of the direct current amplifier VT—3, and the potential developed across resistor 15 is applied between the grid and cathode of the lower section of VT—3. The coil 16 of balanced relay RE—1 is connected in series with the anode of the upper section of VT—3, and coil 17 is connected in series with the anode of the lower section. The anode current of the section of VT—3 associated with the resistor having the lesser direct current potential developed thereacross will predominate over the current in the other section associated with the resistor having the greater potential thereacross, thereby producing unequal energization of the coils 16 and 17 of relay RE—1, thus causing the armature 18' to shift to one side or the other. The armature 18' is normally held in a neutral or balanced position by means of a very light spring when no current is flowing in the relay coils. When the armature is drawn into engagement with the contact 18 the terminals R and R' are connected together to close a circuit to a relay capable of connecting the glide path signal from the automatic approach coupling to the pitch signal channel of the electrical auto pilot. When the armature is drawn into engagement with the contact 19 the circuit across terminals R and R' is broken. Thus it may be seen that the relay RE—1 is connected in such manner that an aircraft reaching the glide beam I (Fig. 2) will receive a glide signal which will be passed through the glide path receiver and result in a change of polarity in the receiver output as the glide beam is intercepted. This change will in turn shift the armature of the relay RE—1 to the contact 18 by the action of the automatic approach coupling and the circuit involving tubes VT—1, VT—2 and VT—3, thus closing the relay circuit connected to terminals R and R'.

As previously stated the glide path sensor unit may close a relay circuit adapted to feed the glide path signals from the automatic approach coupling into an electrical auto pilot having a pitch signal system. However in accordance with one of the objects of the invention the sensor unit may be used instead to actuate the sequence selector stepping relay in an automatic flight control system. In this case the sequence selector or stepping switch will make the glide path signal connection to the auto pilot, as well as other connections suitable for the glide phase of the flight such as motor circuits for the lowering of wing flaps and the lowering of landing wheels. For disclosure of an automatic flight control system with which the present glide path sensing means might be associated reference is made to the U. S. patent to Crane et al. No. 2,322,225.

The various values of components given may of course vary to some extent as may the various potentials applied. The 400 cycle alternating current source is the normal supply required for electrical auto pilot systems and may be at a potential of 115 volts. The vacuum tubes VT—1, VT—2 and VT—3 may be of Type No. 1633 but other similar tubes may be substituted. The resistors 14 and 15 may be of 3000 ohms each, and the resistors 20 and 21 may be of 200 ohms each.

The bypass condenser 22 is preferably of 0.05 microfarad value. It is further noted that the relay coils 16 and 17 have condensers 16' and 17' connected thereacross, these condensers preferably being of 0.1 microfarad capacity. The purpose of these capacitors is to bypass or absorb the alternating current component of the amplified signal, which component might cause chattering of the relay armature.

The embodiments of the invention herein shown and described are to be regarded as illustrative only and it is to be understood that the invention is susceptible to variations, modifications and changes within the scope of the appended claim.

I claim:

In an automatic aircraft landing control system of the type including an automatic pilot and a glide path receiver and a switch for connecting the receiver to the automatic pilot, a glide path sensor unit for closing said switch when said receiver intercepts signals from a glide path signal field radiated upwardly from a landing field at an acute angle thereto, said sensor unit comprising a pair of vacuum tubes each having an anode, a cathode and a control grid, means for applying an alternating glide path signal to the control grids of said vacuum tubes in opposed phase relation, means for applying a second alternating signal from a signal source carried on the aircraft to the anodes of said vacuum tubes in in-phase relation, said alternating signals each having the same frequency, means connected in series between each of said anodes and said signal source carried on the aircraft for developing rectified voltages from said second alternating signal, means including direct current vacuum tube amplifiers for converting said rectified voltages into currents inversely related thereto in magnitude, and means including a relay having two independent actuating coils for utilizing the relative values of said currents to actuate the switch for connecting the receiver to the automatic pilot.

JAMES L. ANAST.

REFERENCES CITED

The following references are of record in the file of this patent:

UNITED STATES PATENTS

| Number | Name | Date |
|---|---|---|
| 1,818,103 | Sperry | Aug. 11, 1931 |
| 2,134,132 | Koster | Oct. 25, 1938 |
| 2,139,060 | Kear | Dec. 6, 1938 |
| 2,225,346 | La Pierre | Dec. 17, 1940 |
| 2,264,056 | Thacker et al. | Nov. 25, 1941 |
| 2,369,678 | McWhirter et al. | Feb. 20, 1945 |
| 2,393,624 | Ferrill | Jan. 29, 1946 |
| 2,398,421 | Frische et al. | Apr. 16, 1946 |
| 2,405,231 | Newhouse | Aug. 6, 1946 |
| 2,414,791 | Barrow | Jan. 28, 1947 |
| 2,429,595 | Abraham | Oct. 28, 1947 |